(12) United States Patent
Yamada et al.

(10) Patent No.: US 7,397,405 B2
(45) Date of Patent: Jul. 8, 2008

(54) AUDIO DEVICE ARRANGEMENT STRUCTURE FOR A MOTORCYCLE, AND MOTORCYCLE INCORPORATING SAME

(75) Inventors: Katsuhisa Yamada, Saitama (JP); Koji Suzuki, Saitama (JP); Yuichi Kato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 15 days.

(21) Appl. No.: 11/482,178

(22) Filed: Jul. 6, 2006

(65) Prior Publication Data

US 2007/0035420 A1 Feb. 15, 2007

(30) Foreign Application Priority Data

Jul. 29, 2005 (JP) ............. 2005-220898

(51) Int. Cl.
*H03M 3/00* (2006.01)
(52) U.S. Cl. ...................... 341/143; 381/302
(58) Field of Classification Search ............ 341/50, 341/143; 381/302, 86, 99; 296/37.1
See application file for complete search history.

(56) References Cited

U.S. PATENT DOCUMENTS 6,853,553 B2 * 2/2005 Seaton et al. ............. 361/695
2005/0265566 A1 * 12/2005 Suzuki et al. ............. 381/302

FOREIGN PATENT DOCUMENTS

JP 2000-228793 8/2000

* cited by examiner

*Primary Examiner*—Rexford Barnie
*Assistant Examiner*—Joseph Lauture
(74) *Attorney, Agent, or Firm*—Carrier, Blackman & Associates, P.C.; William D. Blackman; Joseph P. Carrier (57) ABSTRACT

An audio device arrangement structure for a motorcycle is configured and arranged to provide high-quality sound output. The audio device arrangement structure serves to mount an audio device, which includes an audio unit, an amplifier and at least one speaker, for a motorcycle. The audio unit is mounted at the front of the vehicle inside a top cover, between the top cover and the air cleaner. The amplifier is provided separately from the audio unit, and is arranged at the rear of the vehicle in the inside of a housing provided at a rear portion of a rear fender. The amplifier is supported on the housing by rubber bushings, to isolate the amplifier from vibrations of the vehicle body.

17 Claims, 10 Drawing Sheets

AUDIO DEVICE ARRANGEMENT STRUCTURE FOR A MOTORCYCLE, AND MOTORCYCLE INCORPORATING SAME

CROSS-REFERENCE TO RELATED APPLICATIONS

The present invention claims priority under 35 USC 119 based on Japanese patent application No. 2005-220898, filed on Jul. 29, 2005. The subject matter of this priority document is incorporated by reference herein.

BACKGROUND OF THE INVENTION

1. Field of the Invention

The present invention relates to an audio device arrangement structure for a motorcycle. More particularly, the present invention relates to an audio device arrangement structure in which an amplifier is located at a portion of a motorcycle which is separate and spaced apart from a main audio device.

2. Description of the Background Art

Conventionally, it is well known to provide a motorcycle with an audio device which generates audio signals, to arrange an audio unit of the audio device in front of a seat and, at the same time, to arrange speakers at left and right sides of an instrument panel display portion, which performs a display of a speed and the like on a front central portion of a vehicle body. Such a vehicle is disclosed, for example, in Japanese published patent document number JP-A-2000-228793.

In the above-mentioned known audio device, in view of the relationship between the audio unit and a mounting space of the audio device, an amplifier is integrally incorporated in the audio unit. Audio data which is read from a media such as a cassette tape is directly output to speakers after being adjusted by the audio unit and, thereafter, is output as sounds from speakers.

In order to permit a rider to enjoy sophisticated music while touring for a motorcycle, it is necessary to provide an audio system, on the motorcycle, which can exhibit at least a predetermined level of performance. However, in the conventional audio device, which integrally incorporates the amplifier in the audio unit, the sound quality which can be produced is limited.

SUMMARY

Accordingly, it is an object of the present invention to provide an audio device arrangement for use for a motorcycle which can provide a high-quality sound output.

To achieve the above-mentioned object, a first aspect of the invention is characterized in that in an audio device arrangement structure for a motorcycle, which serves to mount an audio device (for example, an audio device 50 of the embodiment) which includes a device (for example, an audio unit 51 of the embodiment) which generates audio signals, an amplifier (for example, an amplifier 54 of the embodiment) and a speaker (for example, respective speakers 52, 53 of the embodiment) for a motorcycle (for example, motorcycle 1 of the embodiment), the amplifier is arranged separately from the device which generates the audio signals.

A second aspect of the invention is characterized in that the amplifier is arranged in the inside of a housing (for example, a housing 81 of the embodiment) which is provided at a rear portion of a rear fender (for example, a rear fender 60 of the embodiment) of the motorcycle.

A third aspect of the invention is characterized in that the rear fender is configured to be dividable in the longitudinal direction of a vehicle so as to provide a rear fender front portion that is separable from a rear fender rear portion.

A fourth aspect of the invention is characterized in that a cross beam (for example, a lower cross beam 93 of the embodiment) extends between left and right stays (for example, saddle bag stays 18 of the embodiment) which support a saddle bag (for example, a saddle bag 40 of the embodiment) in the motorcycle, a bent-shape portion (for example, U-shaped portion 95 of the embodiment) which supports the housing is formed on the cross beam, a plurality of projections (for example, angular projections 88 of the embodiment) for positioning the bent-shape portion is arranged in the housing, and the bent-shape portion is allowed to pass between respective projections.

A fifth aspect of the invention is characterized in that an opening (for example, an upper opening 82 of the embodiment) of the housing and an upper portion of the amplifier are covered with a cover (for example, a cover 91 of the embodiment) which is formed of a resilient material, and the cover is engaged with the housing.

A sixth aspect of the invention is characterized in that the amplifier is supported on the housing by way of a resilient material (for example, a rubber bushing 57 of the embodiment).

A seventh aspect of the invention is characterized in that the housing includes a water drain hole (for example, a water drain hole 87 of the embodiment).

An eighth aspect of the invention is characterized in that a ventilation hole (for example, a ventilation hole 58 of the embodiment) is formed in a case (for example, an amplifier case 55 of the embodiment) of the amplifier and the ventilation hole is covered with a moisture-permeable waterproof sheet (for example, a moisture-permeable waterproof sheet 58*a* of the embodiment).

According to the first aspect of the invention, by providing the amplifier separately from the device which generates the audio signals, it is possible to provide a large-sized amplifier thus realizing high-quality sounds whereby the present invention provides a rider a joy of listening to sophisticated music during touring.

According to the second aspect of the invention, the housing per se is cooled by receiving the wind generated by vehicle travel. At the same time, the amplifier, which is arranged in the inside of the housing, is also favorably cooled, whereby the heat radiation property of the amplifier is enhanced.

According to the third aspect of the invention, at the time of performing amplifier maintenance, it is possible to remove a side (a rear side) of the rear fender on which the housing for the amplifier is provided and hence, the operability of the maintenance is enhanced.

According to the fourth aspect of the invention, the weight of both the housing and the amplifier are supported on the bent-shape portion of the cross beam and hence, a load attributed to the weight of the amplifier or the like which is applied to the rear fender is reduced. Further, by allowing the bent shape portion to pass between the plurality of projections formed in the housing, it is possible to position the housing in a plurality of directions whereby an assembling operation of the vicinity of the housing to the vehicle body is facilitated.

According to the fifth aspect of the invention, by covering the opening of the housing and the upper portion of the amplifier with the cover made of the resilient material, it is possible to take the wind generated by vehicle travel in the housing by forming a predetermined gap between the opening of the housing, and the cover which is engaged with the opening, while ensuring the waterproof property of the amplifier whereby the heat radiation property of the amplifier can be further enhanced.

According to the sixth aspect of the invention, by supporting the amplifier by way of the resilient member, the propagation of vibrations from the vehicle body to the amplifier is reduced.

According to the seventh aspect of the invention, even when water intrudes in the inside of the housing, water can be speedily discharged to the outside through the water drain hole and hence, the waterproof property of the amplifier is favorably ensured.

According to the eighth aspect of the invention, it is possible to simultaneously ensure both the ventilation property and the waterproof property of the inside of an amplifier case. Particularly, even when the amplifier, whose temperature is elevated due to the continuous use of the amplifier, is splashed with water and the inside of the case assumes a low pressure, for example, it is possible to prevent water from being drawn into the inside of the case through the ventilation hole.

Modes for carrying out the present invention are explained below by reference to an embodiment of the present invention shown in the attached drawings. The above-mentioned object, other objects, characteristics and advantages of the present invention will become apparent from the detailed description of the embodiment of the invention presented below in conjunction with the attached drawings.

DETAILED DESCRIPTION

A selected illustrative embodiment of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art. Here, the directions of front, rear, left, right and the like in the explanation made hereinafter are, unless otherwise specified, assumed to be equal to the corresponding directions of the vehicle, taken from the vantage point of a driver. Further, in the drawings, an arrow FR indicates the frontward direction of the vehicle, an arrow LH indicates the leftward direction of the vehicle, and an arrow UP indicates upward direction of the vehicle.

Figure 1:
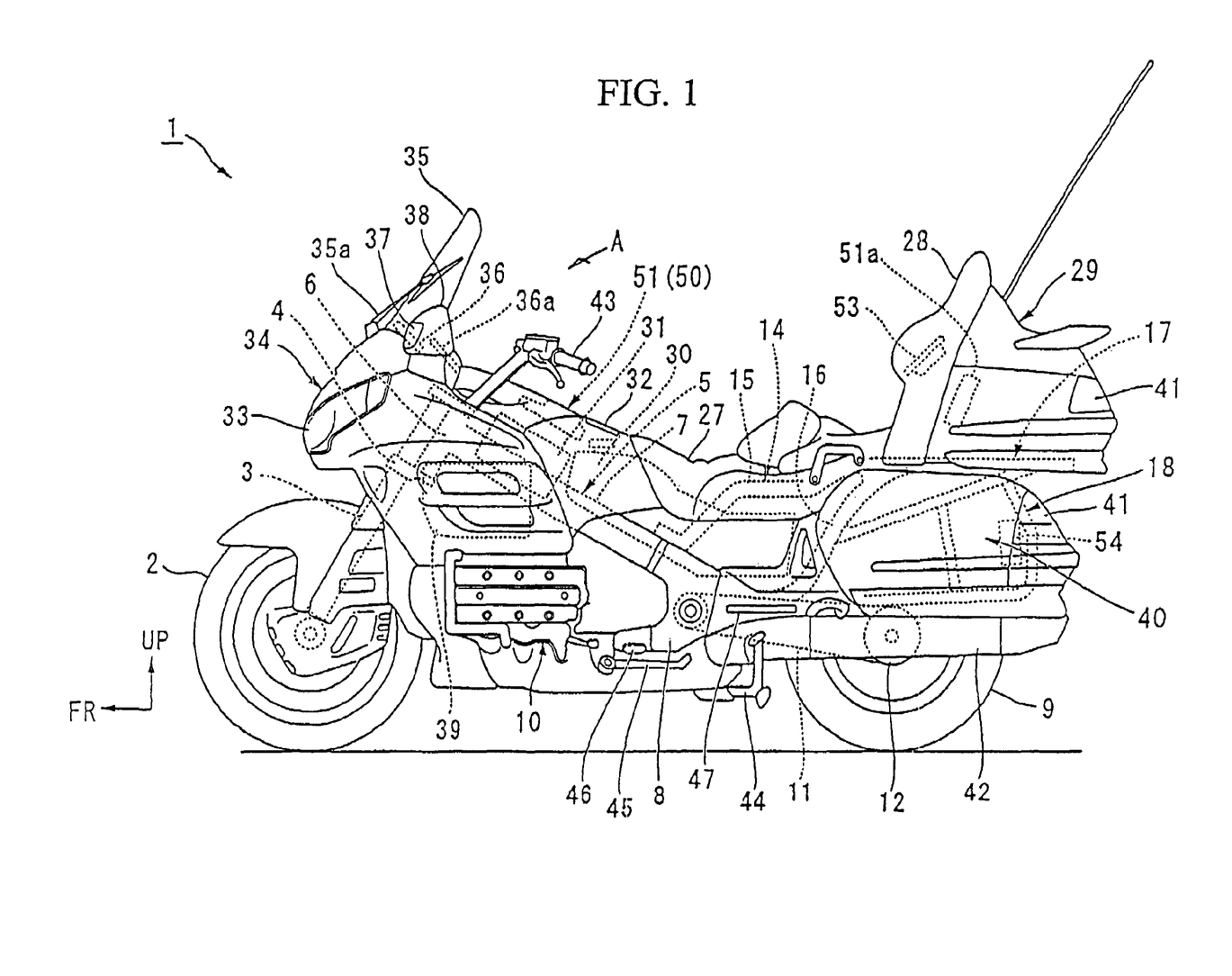
FIG. 1 is a side elevational view of a motorcycle incorporating an audio device according to an illustrative embodiment of the present invention, showing the audio unit mounted in front of the seat and the amplifier mounted in an accommodating box near the rear fender and between the saddle bags.

As shown in FIG. 1, a front wheel 2 of a motorcycle 1 is pivotally supported on lower end portions of a pair of left and right front forks 3. Upper portions of the respective front forks 3 are steerably pivotally supported on a head pipe 6, which is mounted on a front end portion of a vehicle body frame 5 by way of a steering stem 4. A front handlebar 43 is mounted on an upper portion of the steering stem 4. Left and right main frames 7 extend, respectively, from the head pipe 6 obliquely in a downward and rearward direction, and a water-cooled 4-stroke horizontal counter 6-cylinder engine 10, which constitutes a prime mover of the motorcycle 1, is mounted on lower portions of the main frames 7.

A pivot plate 8 is connected to rear end portions of the respective main frames 7. A front end portion of a swing arm 11, which pivotally supports a rear wheel 9 thereon, is pivotally supported on pivot plate 8 in a rocking manner. The swing arm 11 is of a cantilever type which pivotally supports the rear wheel 9 at a rear end portion of a hollow cantilever arm. A drive shaft, not shown in the drawing, which extends from an engine 10, penetrates the inside of the cantilever arm. The power transmission between the engine 10 and the rear wheel 9 is achieved by way of the drive shaft and a gear box 12 arranged at the center of the rear wheel.

A front end portion of a seat frame 14, which supports a rider's seat 27 thereon, is joined to the vicinity of the pivot plate 8. The seat 27 has a front portion thereof formed as a rider seat portion and a rear portion thereof formed as a rear pillion passenger seat portion, while a rear trunk 29, which forms a seat back 28 for a rear pillion passenger, is arranged behind the seat 27. Further, a fuel tank 30, which extends to a lower portion of a front portion of the seat 27, an air cleaner box 31 for an engine intake, and the like, are arranged in front of the seat 27, and these parts are covered with a top cover 32 which constitutes an exterior body component.

A large-sized front cowl 34 includes a pair of left and right head lamps 33 and is mounted on a front portion of the vehicle body of the motorcycle 1. At the same time, a large-sized wind screen 35, which includes a wiper 35a, is mounted on an upper portion of a front portion of the front cowl 34. An instrument panel 36 is provided on a rear side of an upper portion of the front cowl 34. The instrument panel 36 includes a speedometer, a tachometer and other conventional gauges and monitoring equipment. The top cover 32 is contiguous with the instrument panel 36, and extends obliquely therefrom in a downward and rearward direction, to cover a portion of the vehicle body extending from a rear side of the front cowl 34 to a front portion of the seat 27. Left and right mirror assemblies 38, which each include a respective front turn signal lamp 37, are mounted on both sides of an upper portion of the front cowl 34, while a radiator 39, for cooling the engine 10, is arranged in the direction substantially extending in a front-to-rear longitudinal direction on a lateral-direction inner side (vehicle-width-direction inner side) of the front cowl 34.

Left and right saddle bags 40 are arranged behind the seat 27 and on both sides of a lower portion of the rear trunk 29. A respective rear combination lamp 41 is arranged on rear portions of each of the left and right saddle bags 40, and on both sides of a rear portion of the rear trunk 29, which functions as tail lamps, brake lamps and a rear turn signal blinker. A muffler 42 for silencing engine exhaust gas is arranged below the left and right saddle bags 40.

A main stand 44, which supports the vehicle body in an upright state, is provided in the vicinity of a lower ends of left and right pivot plates 8 in the main body frame 5, such that the main stand 44 can be stored. In front of a lower portion of the left pivot plate 8, a side stand 45 which supports the vehicle body in a leftwardly inclined state (a state in which an upper portion of the vehicle body is positioned on a left side) is provided, such that the side stand 45 can be stored. Further, in front of lower portions of the left and right pivot plates 8, a step 46 for a rider is provided, while behind the left and right pivot plates 8, a step board 47 for a rear pillion passenger is provided.

In the embodiment of FIG. 1, the above-mentioned motorcycle 1 includes an audio device 50, with an audio unit 51 (device which generates audio signals) disposed in front of the seat 27. The audio unit 51 is arranged inside of the top cover 32. The audio device 50 also includes respective front speakers 52 which are arranged on both sides of the instrument panel 36 inside of the front cowl 34, respective rear speakers 53 which are arranged on both sides of the seat back 28 formed on the front portion of the rear trunk 29, and an amplifier 54 which is arranged behind the rear fender 60, between the left and right saddle bags 40.

Figure 2:
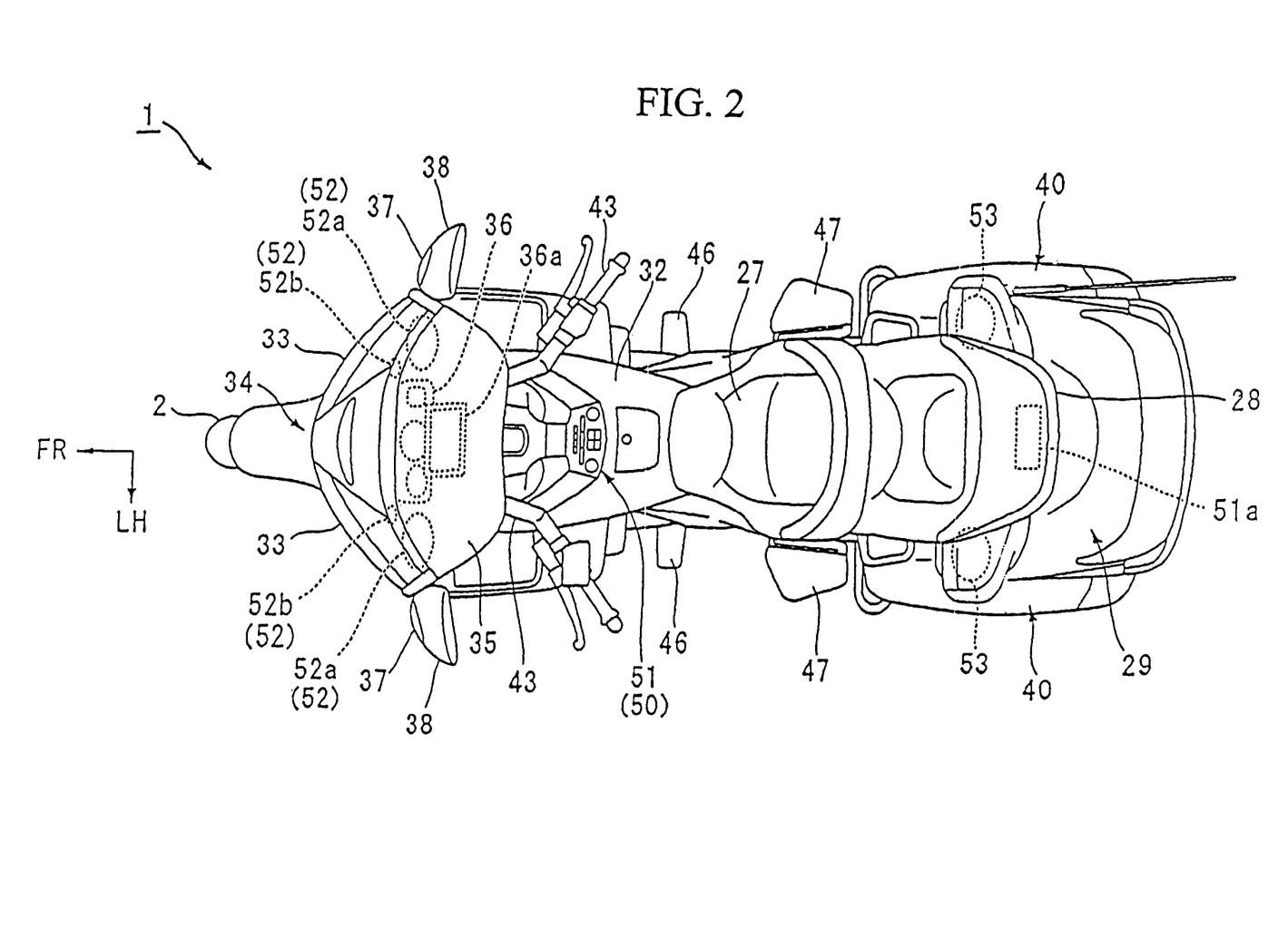
FIG. 2 is an upper plan view of the motorcycle of FIG. 1, showing the audio unit and front speakers arranged around the instrument panel, and showing the rear speakers and CD changer mounted to the sides and rear of the seat.

In the front speaker 52, a relatively small-sized high-sound speaker 52b is arranged separately from a relatively large-sized middle-and-low sound speaker 52a. Here, on a rider's side of a center portion of the instrument panel 36, a liquid crystal display part 36a of a vehicle navigation system is arranged.

The audio unit 51 includes a plurality of audio sources such as a radio tuner, a cassette tape player, a CD (Compact Disk) player, a MD (Mini Disk) player and the like. Here, in the drawing, numeral 51a indicates a CD changer which constitutes a portion of the audio unit 51 which is housed in the inside of the rear trunk 29. Audio signals which are output from the audio unit 51 are amplified by the amplifier 54 and, thereafter, are output as actual sound from the respective front speakers 52 and the rear speaker 53.

Figure 5:
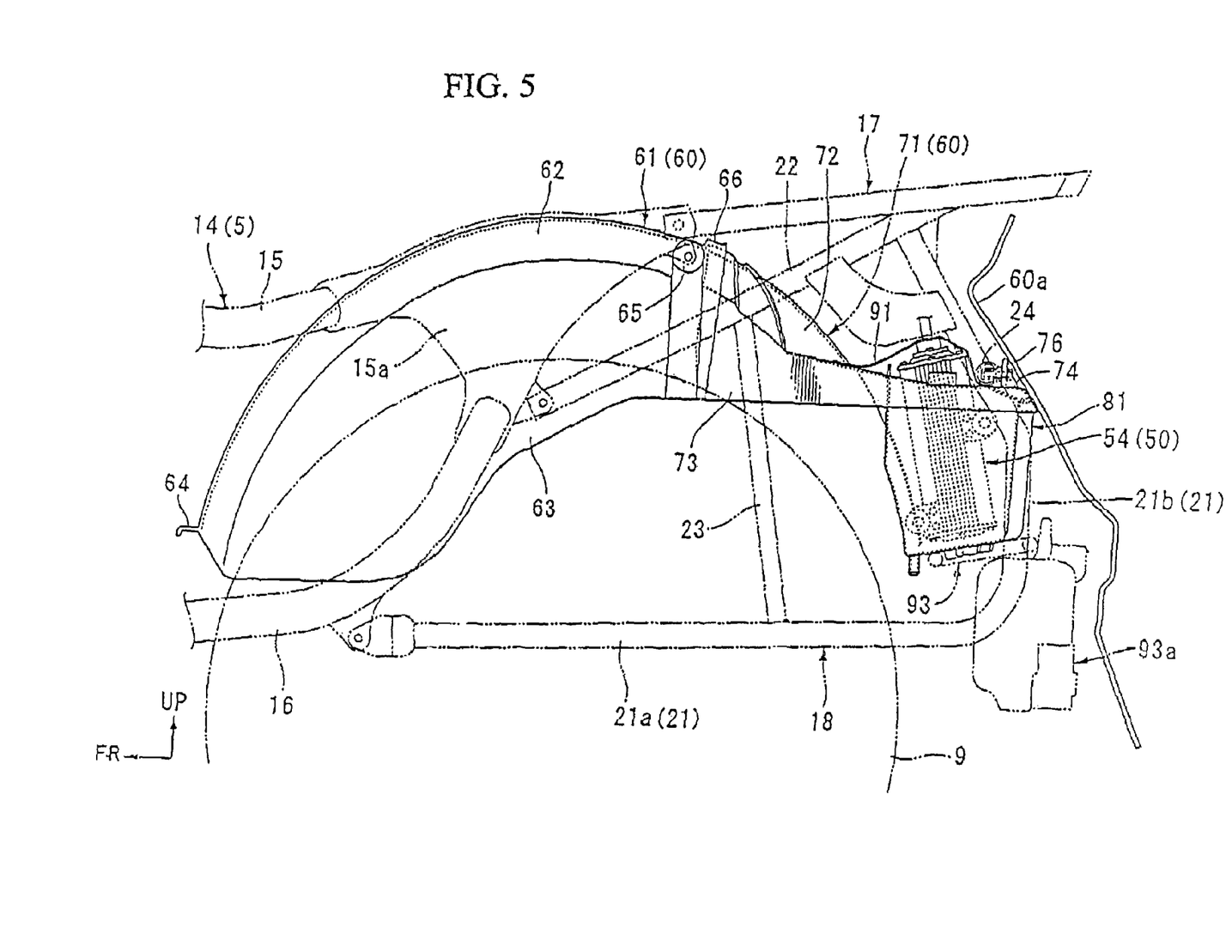
FIG. 5 is a side detail view of a periphery of a rear fender of the motorcycle.

To explain the present invention also in conjunction with FIG. 5, a seat frame 14 includes left and right seat rails 15 which extend rearwardly in the slightly rearward and upward direction from upper end portions of the left and right pivot plates 8, and left and right gusset pipes 16 which extend obliquely in the upward and rearward direction from rear end portions of the left and right pivot plates 8 and are connected to rear end portions of the seat rails 15, wherein these rear end portions are joined to each other by way of an end plate 15a having a triangular shape as viewed in a side view. A rear trunk stay 17, which supports the rear trunk 29, and front end portions of the left and right saddle bag stays 18, which support the saddle bags 40, are respectively joined to a rear portion of the seat frame 14.

The rear trunk stay 17 is formed by integrally joining plural kinds of steel members by welding or the like, and has a U-shape which opens a front side thereof as viewed in a plan view (not shown in the drawing). Both ends of a front end portion of the rear trunk stay 17 are fixed to both sides of a rear end portion of an upper portion of the seat frame 14, by being bolted thereto.

Further, the saddle bag stay 18 is also formed by integrally joining plural kinds of steel members by welding or the like, and is mainly constituted of a lower pipe 21 which is integrally formed of a lower horizontal portion 21a, which is arranged substantially horizontally, and a lower raised portion 21b, which is raised from a rear end portion of a lower horizontal portion 21a, and an upper pipe 22, which is arranged in the rearward and upward direction and has a rear end portion thereof joined with an upper end portion of a raised rear portion 21b of the lower pipe 21 by welding.

Both end portions of a connecting pipe 23, which is arranged substantially vertically, are joined by welding to a middle portion of the lower horizontal portion 21a of the lower pipe 21 and an middle portion of the upper pipe 22. Further, a front end portion of the upper pipe 22 is bolted to a rear portion of the gusset pipe 16 of the seat frame 14, while a front end portion of the lower pipe 21 is bolted to a lower portion of the gusset pipe 16.

The raised rear portion 21b of the lower pipe 21 has an middle portion thereof curved such that the middle portion projects rearwardly, and an upper end of the raised rear portion 21b is joined to the rearwardly and upwardly arranged upper pipe 22 by welding in a state that the upper end portion abuts on the upper pipe 22 in the substantially perpendicular direction. Here, the left and right saddle bag stays 18 are integrally connected laterally together with the rear trunk stay 17 by making rear ends of the left and right upper pipes 22 abut on and joined by welding to a lower side of a rear portion of the laterally integrated rear trunk stays 17 and by making both ends of a upper cross pipe 24 which extends in the lateral direction joined by welding to the vicinity of the curved portions of the raised rear portions 21b of the left and right lower pipes 21.

Figure 3:
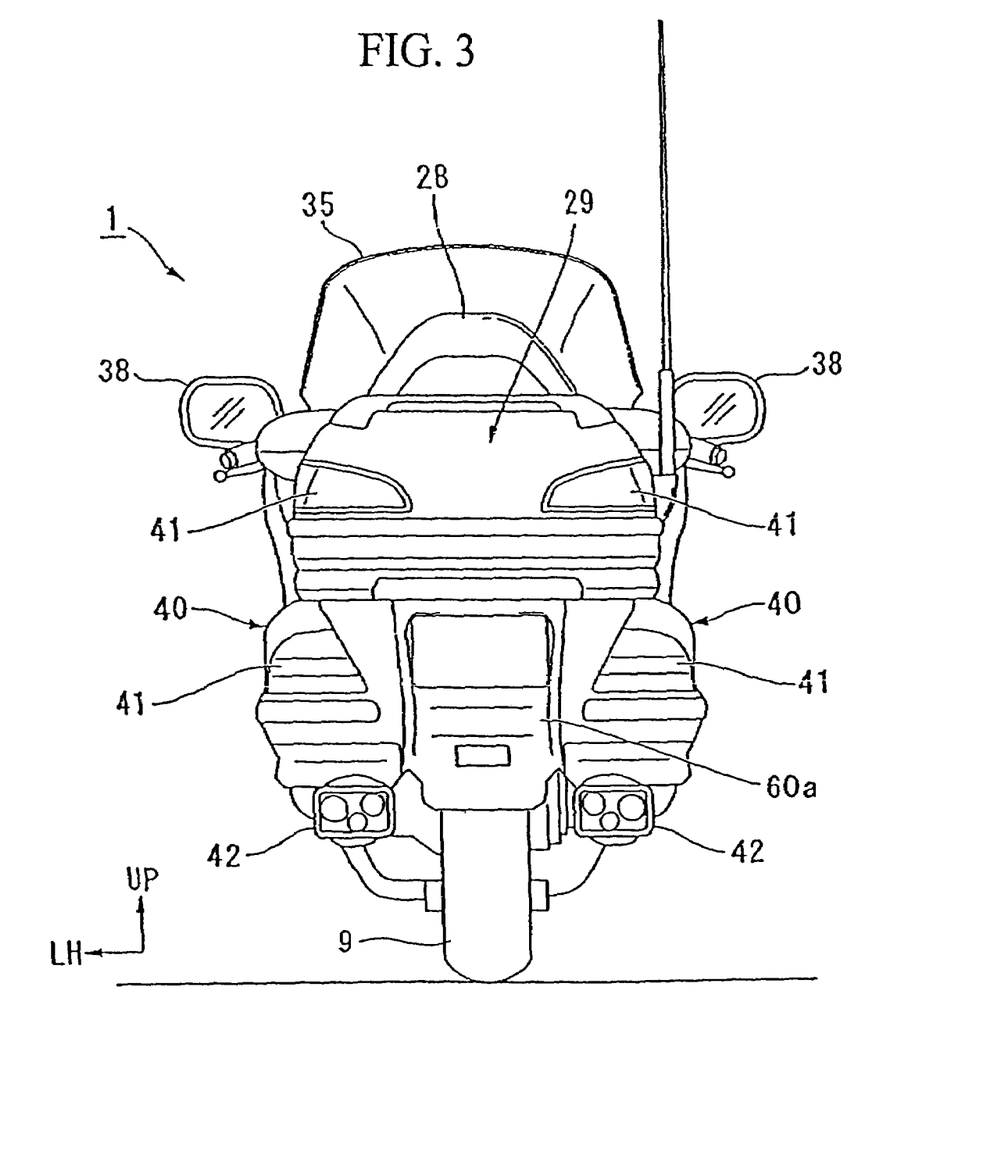
FIG. 3 is a rear elevational view of the motorcycle of FIGS. 1-2, showing the rear fender disposed below the rear trunk and between the left and right saddle bags.
Figure 4:
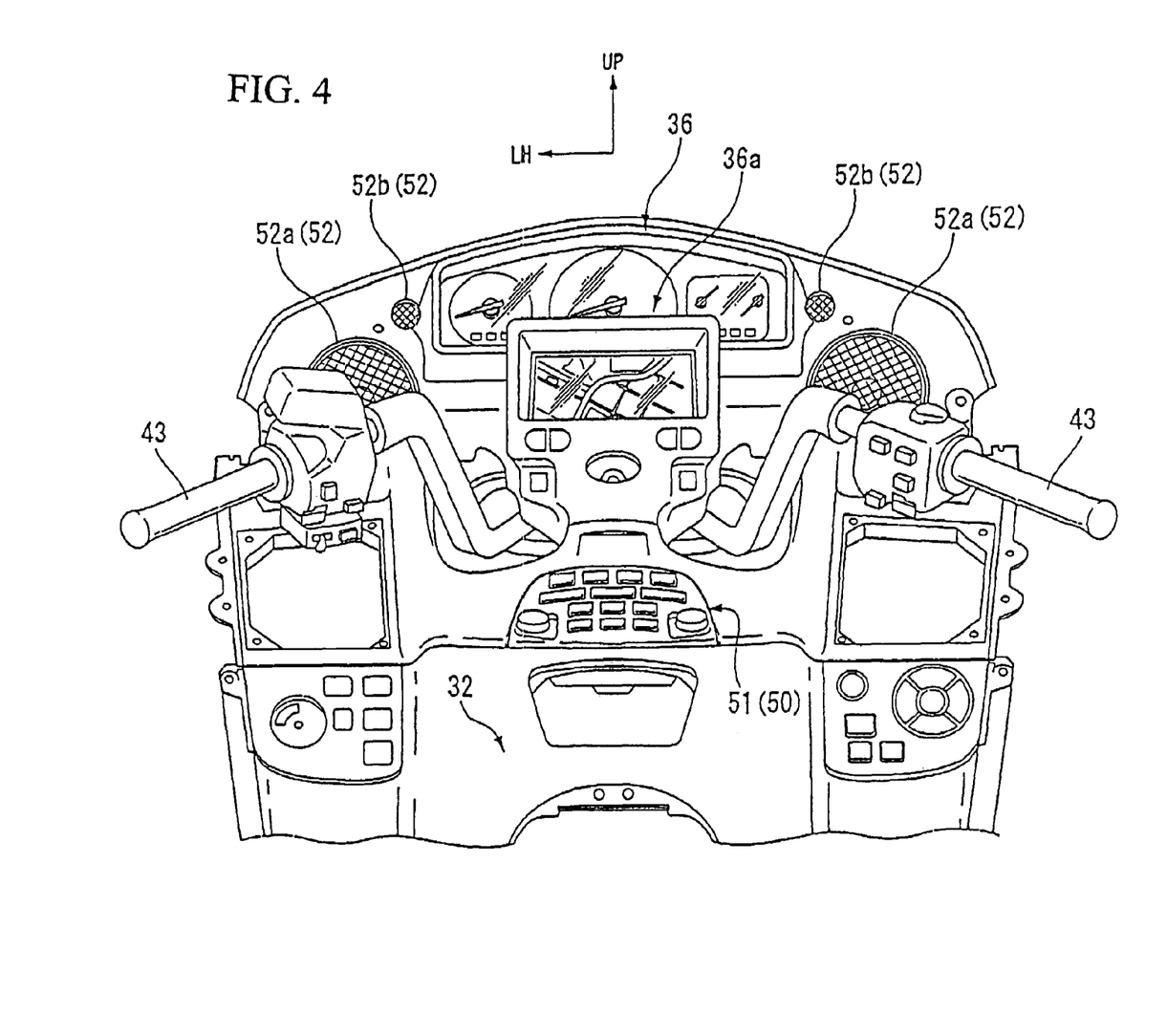
FIG. 4 is a detail perspective view of the vehicle control panel as viewed in the direction indicated by an arrow A in FIG. 1.

A rear fender is provided between the left and right saddle bag stays 18, which covers the rear wheel 9 of the motorcycle 1 from above along the circumferential direction thereof. The rear fender 60 is made of synthetic resin such as polypropylene or the like, and is configured to be dividable in the longitudinal direction above a position which is located slightly behind the center of the rear wheel. Here, a front divided body of the rear fender 60 is referred to as a front fender 61 and a rear divided body of the rear fender 60 is referred to as a rear fender 71. Here, behind the rear fender 60, a fender cover 60a which is connected to rear end portions of the left and right saddle bags 40 and constitutes an exterior part is provided (see FIG. 3).

The front fender is integrally formed of a front fender body 62 which is arranged at a position spaced apart from the tread surface of the rear wheel 9 by a predetermined amount and along the tread surface, and left and right front fender side walls 63 which extend downwardly from both side peripheries of the front fender body 62. An engaging portion 64 which is engaged with the vehicle body is formed on a front end portion of the front fender 61, and fastening portions 65 which are fixed to a fixing portion formed on a lower side of a rear end portion of the seat frame 14 are formed on both sides of the rear end portion of the front fender 61, wherein in a state that the engaging portion 64 is engaged with the vehicle body, a bolt is inserted into the left and right fastening portions 65 from the outside in the lateral direction and is fastened into the fixing portion thus fixing the front fender 61 to the vehicle body.

On a rear end portion of the front fender 61, bifurcated wall portions 66 which are bifurcated from the vicinity of the rear end portion and extend rearwardly substantially in parallel to the rear end portion are integrally formed, and a front end portion of the rear fender 71 is inserted and held in the inside of an engaging groove which is formed between the bifurcated wall portions 66 and the rear end portion.

A front half portion of the rear fender 71 is integrally formed of a rear fender body 72 which is arranged at a position spaced apart from the tread surface of the rear wheel 9 by a predetermined amount and along the tread surface, and left and right rear fender side walls 73 which are formed in a downwardly extending manner from both side peripheries of the rear fender body 72. The rear fender body 72 is formed contiguously with the front fender body 62, while the rear fender side walls 73 are formed contiguously with the front fender side walls 63. Here, the rear fender side walls 73 and the front fender side walls 63 are arranged extending substantially in a front-to-rear direction. Further, the lower edges of the rear fender side walls 73 form an approximately horizontal lower peripheral shape to keep a height of a lower end at a front end portion at an approximately fixed value.

Further, a rear half portion of the rear fender 71 is arranged to form a housing 81 for the amplifier 54, which is provided separate and spaced apart from the audio unit 51 of the audio device 50.

Figure 6:
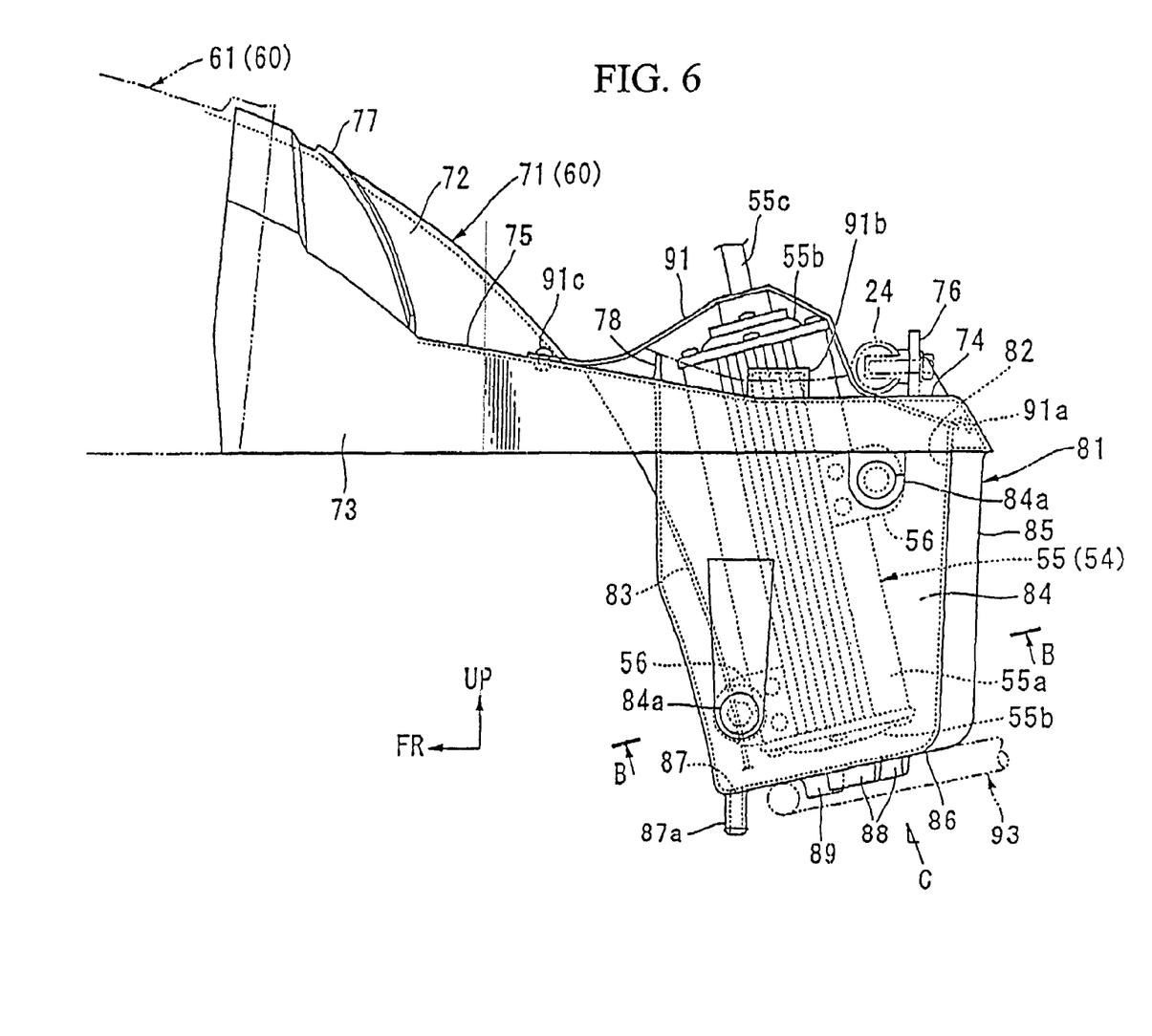
FIG. 6 is a side detail view of a rear portion of the rear fender of the motorcycle.
Figure 7:
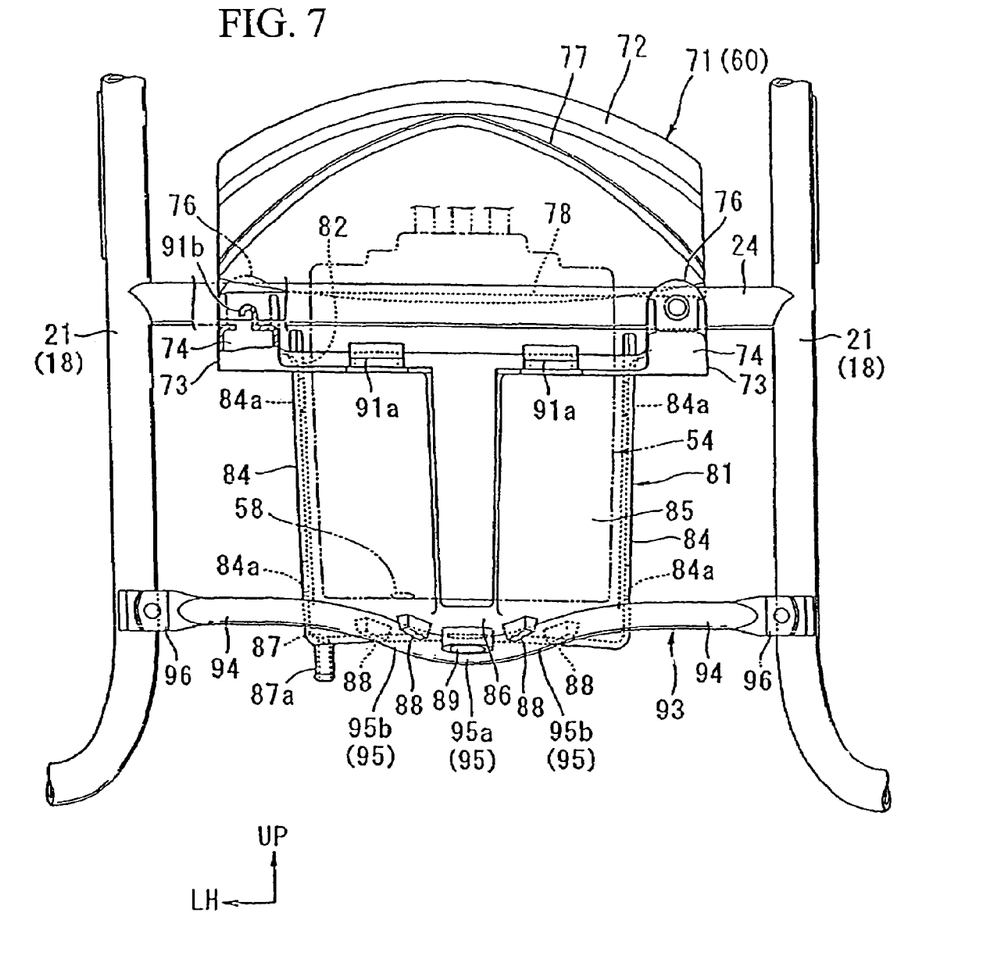
FIG. 7 is a back detail view of a rear portion of the rear fender of FIG. 6.

As shown in FIGS. 6 and 7, the housing 81 has a generally box-like shape which opens upwardly, wherein a lateral width of the housing 81 is narrower than a lateral width of the rear fender body 72, and at both side peripheral portions of the upper opening 82, left and right rear extending portions 74 which extend rearwardly from both sides of the front half portion of the rear fender 71 are positioned. Each of the respective rear extending portions 74 of the rear fender has a U-shaped cross section which is opened downwardly, and functions as a stay which can suspend the housing 81 thereon.

Outer side walls of the rear extending portions 74 are arranged substantially coplanar with the rear fender side walls 73, while inner side walls of the rear extending portions 74 are arranged to extend upwardly in the vicinity of the side periphery of the upper opening 82 of the housing 81. Further, upper walls of the rear extending portions 74 have front half portions thereof inclined slightly rearwardly and downwardly, and rear half portions thereof arranged substantially horizontally. Here, the upper walls of the rear extending portions 74 are formed contiguously laterally while avoiding the housing 81 and the rear fender body 72, thus forming an upper wall portion 75 which is inclined slightly rearwardly and downwardly in the rear fender 71 (see FIG. 6).

As shown in FIG. 7, the upper cross pipe 24, which extends between left and right saddle bag stays 18, is arranged right above the rear portions of the rear extending portions 74. At the same time, rear fixing portions for the rear fender 71 are formed on both sides of the upper cross pipe 24. On the other hand, fastening portions 76, which are fastened to the rear fixing portions, are provided above the rear portions of the left and right rear extending portions 74, wherein in a state that the front end portion of the rear fender 71 is inserted into the rear end portion of the front fender 61, a bolt is inserted into the right and left fastening portions 76 from behind, and is fastened to the rear fixing portion, whereby the rear fender 71 is fixed to the vehicle body.

The housing 81 has both sides of an upper opening 82 thereof supported on the left and right rear extending portions 74, and, at the same time, a lower end portion thereof supported on a lower cross beam 93 (FIG. 7) which extends between the left and right saddle bag stays 18.

Figure 8:
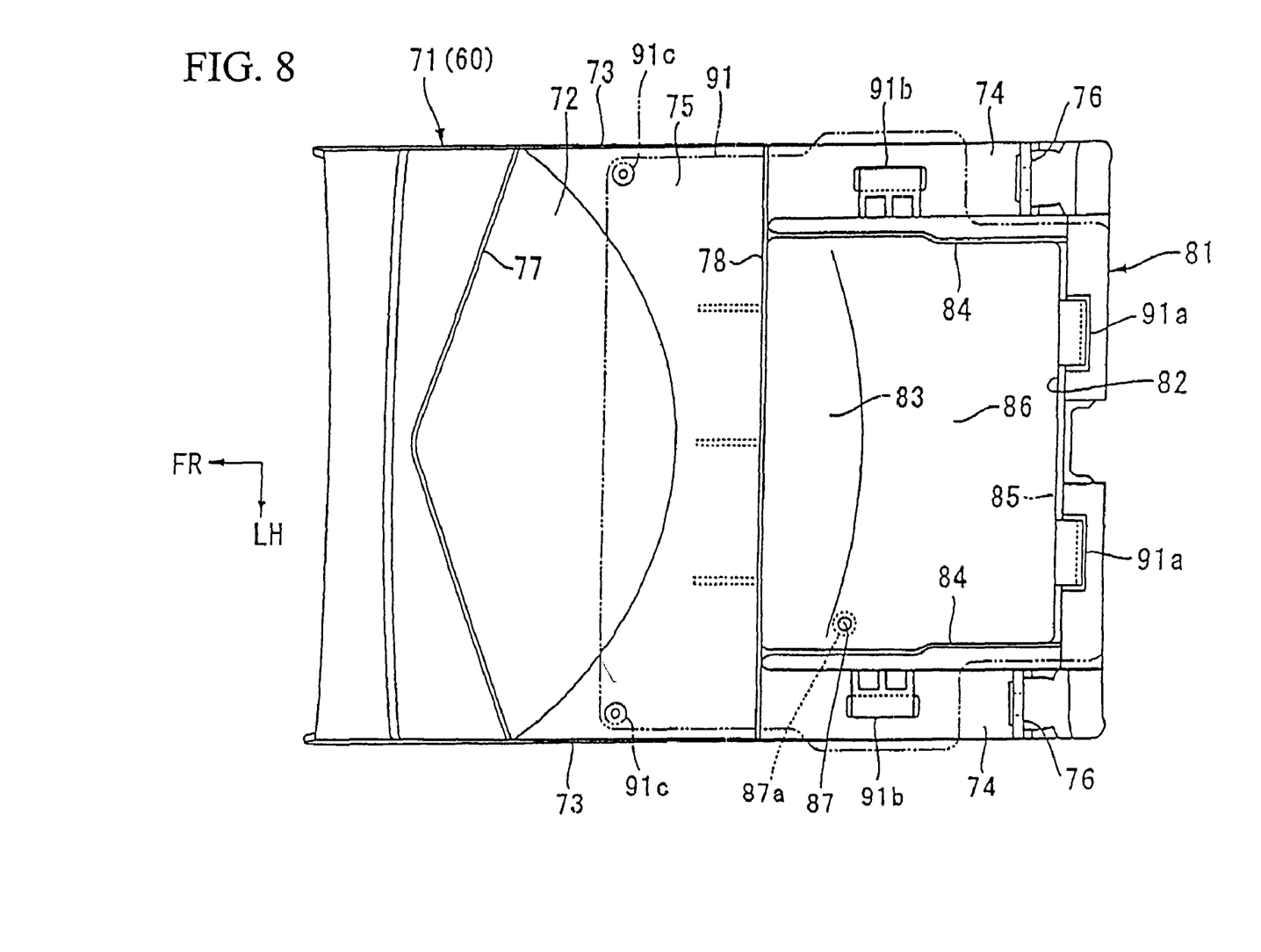
FIG. 8 is an upper plan detail view of a rear portion of the rear fender of FIG. 6.

To explain this embodiment also in conjunction with FIG. 8, a front wall portion 83 of the housing 81 constitutes a contiguous portion of the rear fender body 72, and so is oriented at a position spaced a predetermined amount apart from the tread surface of the rear wheel 9, and is formed in a curved shape to follow the tread surface of the rear wheel 9. Further, left and right side wall portions 84 of the housing 81 are arranged substantially perpendicular to the lateral direction, and mount portions 84a, which support both side portions of the amplifier 54, are formed on an upper rear side and a lower front side, respectively, of the left and right side wall portions 84.

Here, the amplifier 54 is accommodated in the inside of a flat-box-shaped amplifier case 55 which decreases a longitudinal width thereof. The amplifier case 55 has front, rear, left and right walls thereof formed of an aluminum-made heat sink 55a, and an iron-made cover 55b is mounted on each one of upper and lower portions of the heat sink 55a. Here, a connection harness 55c, which serves for connection with external wiring, is led out from a center portion of the upper cover 55b. Such an amplifier 54 is arranged in the inside of the housing 81 in a forwardly inclined state (an inclined state in which an upper portion of the housing 81 is inclined toward the front of the vehicle). Here, an outer periphery and a bottom portion of the amplifier case 55 are spaced apart from an outer wall and a bottom wall of the housing 81 and, at the same time, an upper portion of the amplifier 54 projects upwardly from an upper opening 82 of the housing 81, and the upper cross pipe 24 is positioned behind an upper portion of the amplifier 54.

Figure 9:
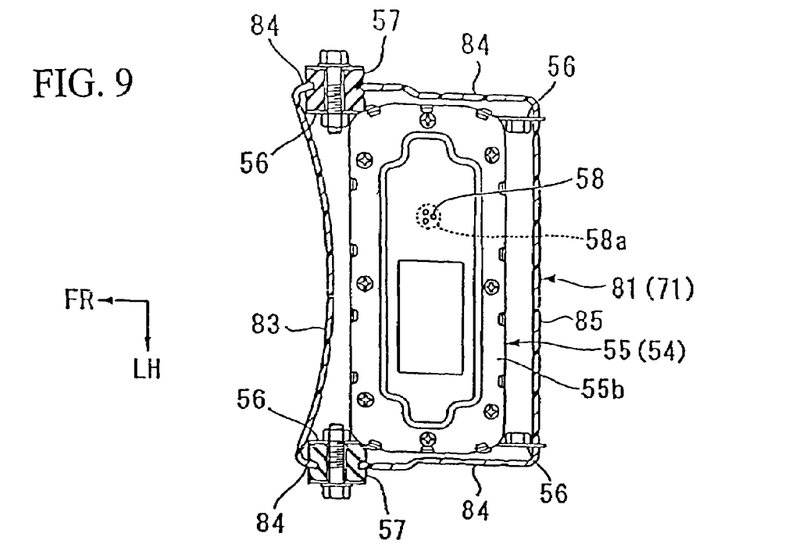
FIG. 9 is a cross-sectional view of the rear fender, taken along a line B-B in FIG. 6, and showing an accommodating space in a housing attached to the fender.

FIG. 9 is a cross-sectional detail view of the rear fender, taken along a line B-B in FIG. 6, and showing an accommodating space in a housing attached to the fender. To explain this embodiment also in conjunction with FIG. 9, a plurality of mount brackets 56, which are formed of a steel plate arranged extending approximately in a front-to-rear direction, are fastened to a rear side of a vertically middle portion and a front side of a vertically lower portion of left and right wall portions of the amplifier case 55. The respective mount brackets 56 overlap the respective mount portions 84a of the housing 81 as viewed in a side view. Here, a plurality of rubber bushings (resilient members) 57 are mounted by fitting in the respective mount portions 84a, and these rubber bushings are configured to allow bolts to be inserted therein in the lateral direction. A metal collar is inserted into the inside of the rubber bushing 57, and the rubber bushing 57 and a lateral inner end of the collar are brought into contact with an outer surface of the mount bracket 56. In such a state, the bolts are inserted laterally into the collars of the respective rubber bushings 57 from the outside, and are fastened to nuts which are welded to the mount brackets 56 thus mounting two portions, that is, both of left and right sides of the amplifier 54 on left and right side wall portions 84 of the housing 81 by rubber mounting.

As shown in FIGS. 6, 7 and 8, a rear wall portion 85 of the housing 81 is arranged substantially transverse to the longitudinal direction of the vehicle. Further, a lower wall portion (a lower end portion) 86 of the housing 81 is provided in a forwardly and downwardly inclined manner. A water drain hole 87 and a water discharge pipe 87a which is connected with the water drain hole 87 are formed at a left front corner portion of the housing, to supply drainage. The reason that the water drain hole 87 is formed at the left front corner portion of the housing, is that it is possible to arrange a lowermost portion of the lower wall portion 86 which is inclined forwardly and downwardly on both sides of a front end portion thereof by curving the front wall portion 83 such that the front wall portion 83 projects rearwardly and, at the same time, when the vehicle body is stopped using the previously-mentioned side stand 45 in a posture that the vehicle body is inclined to the left side, the lowermost portion of the lower wall portion 86 assumes a left side (that is, a same side on which the side stand 45 is provided) at a front end portion of the lower wall portion 86.

A rubber or elastomeric cover 91, which covers the upper opening 82 from above, is mounted on the upper opening 82 of the housing 81. The cover 91 is formed of a rectangular plate as viewed in a plan view (FIG. 8). The cover 91 has two portions, one on each of left and right outer sides of a front end portion thereof, fixed to left and right outer sides of the upper wall portion 75 of the rear fender 71 by rivets 91c. Also, the cover 91 has two portions, one on each of left and right outer sides of a rear end portion thereof engaged with lateral engaging hooks 91b, which are provided in front of the fastening portions 76 on the rear extending portion 74. Further, the cover 91 has two portions, one on each of left and right inner sides of a rear end portion thereof engaged with rear engaging hooks 91a, which are formed on a rear peripheral portion at the upper opening 82 of the housing 81. Here, the left and right outer sides of the rear end portion of the cover 91 are cut out to avoid the fastening portions 76.

By mounting the cover 91 on the upper opening 82 of the housing 81, the center portion of the cover 91 covers the upper opening 82 in a state that a center portion of the cover 91 is lifted by an upper portion of the amplifier 54 which projects from the upper opening 82 of the housing 81 and, at the same time, the cover 91 is pushed downwardly by the upper cross pipe 24 right behind the center portion thereof and hence, the cover 91 is bent in a crank shape as viewed in a side view. Accordingly, between both sides of the cover 91 and both sides of the upper opening 82, predetermined gaps which are formed in a mountain shape as viewed in a side view are formed.

On an upper side of a front portion of the rear fender body 72, a front water blocking rib 77 is mounted in an upstanding blocking manner, and the blocking rib is provided to prevent droplets on the rear fender 60 from being dropped in the inside of the housing 81. The front water blocking rib 77 extends over a whole lateral width of the rear fender body 72, and is formed in a V shape which projects forwardly, with a center portion in the lateral direction set as a peak as viewed in a plan view. The rear fender body 72 is curved such that the rear fender body 72 projects upwardly along the tread surface of the rear wheel 9. The lateral center portion of the water blocking rib 77 also constitutes an uppermost portion of the rib 77 per se, and hence, the droplets which fall on the rear fender 60 are smoothly guided to the oblique outside along the inclination of the water blocking rib 77, and are dropped to both sides of the rear fender body 72.

Further, on a front peripheral portion of the upper opening 82 of the housing 81, a rear water blocking rib 78 is mounted in an upstanding fashion. The rear water blocking rib 78 projects upwardly from the upper wall portion 75 of the rear fender 71 so as to prevent droplets on the rear fender 60 from being dropped into the inside of the housing 81. Further, the rear water blocking rib 78 is formed in the lateral direction extending along the lateral whole width of the upper wall portion 75 and hence, the water blocking rib 78 can prevent the droplets which fall downwardly on the rear fender 60 from being dropped into the inside of the housing 81.

As shown in FIG. 7 and FIG. 9, a ventilation hole 58 is formed in a left side of a lower surface of the amplifier case 55, for adjusting pressure inside the amplifier case 55. The ventilation hole 58 is constituted by forming three holes, for example, and is covered with an existing moisture-permeable waterproof sheet 58a from the inside of the case. That is, the ventilation hole 58 is capable of allowing the moisture in the inside of the amplifier case 55 to be discharged to the outside, and also is capable of blocking intrusion of water therethrough into the amplifier case 55 from the outside. The reason that the ventilation hole 58 is formed in the left side of the lower surface of the amplifier case 55 is that by forming the ventilation hole 58 on the same side as the above-mentioned water drain hole 87, even when a situation that the inside of the housing 81 is filled with water, it is possible to discharge water from the water drain hole 87 when the vehicle body is inclined to the left side, and it is possible to obviate a situation that water intrudes the ventilation hole 58 when the vehicle body is inclined to the right side.

Figure 10:
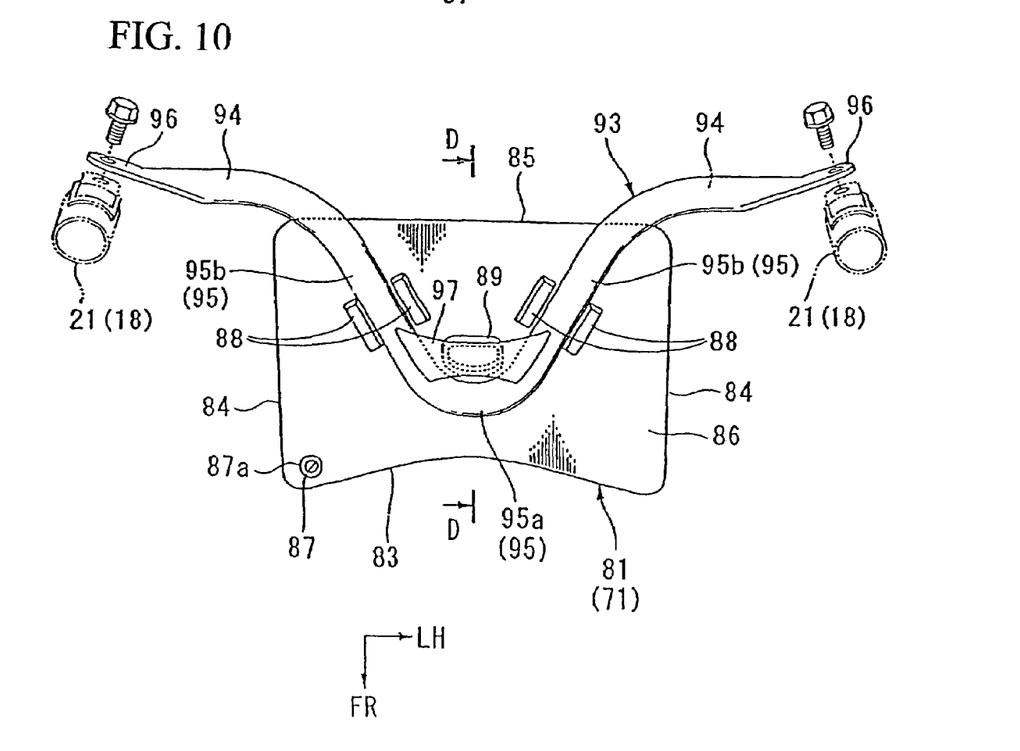
FIG. 10 is a detail view of the rear fender, as viewed in the direction indicated by an arrow C in FIG. 6 showing the underside of the accommodating space and its support structure.

As shown in FIGS. 6, 7 and 10, a lower cross beam 93 is integrally formed of left and right side portions 94 which extend substantially in the lateral direction and a U-shaped portion (bent shape portion) 95 which is curved in a state that the U-shaped portion projects forwardly between both side portions 94 (at a lateral center portion) by applying bending to a steel pipe having a circular cross section. On outer end portions of the left and right side portions 94, fastening portions 96 are formed, which are engaged with beam fixing portions arranged at rear end portions of the lower pipes 21 of the saddle bag stays 18. By inserting bolts into the fastening portions 96 from behind in a state that the fastening portions 96 are brought into contact with the beam fixing portions from behind, and by fastening the bolts to the beam fixing portions, both end portions of the cross beams 93 are fixed to left and right saddle bag stays 18. Here, below the housings 81 and in the inside of (in front of) the fender cover 60a, a washer device 93a for the window screen 35 is arranged (see FIG. 5), and an upper end portion of the washer device 93a is fastened to the saddle bag stay 18 together with the lower cross beam 93.

The left and right side portions 94 of the lower cross beam 93 are positioned behind the lower end portion of the housings 81, while the U-shaped portion 95 is configured to extend to a position right below the housing 81. The U-shaped upper portion 95 is inclined forwardly and downwardly along a lower wall portion 86 of the housing 81, and in a state that the U-shaped portion 95 is fixed to the saddle bag stays 18, the U-shaped portion 95 is brought into contact with a lower surface of the lower wall portion 86 from below thus supporting the lower wall portion 86. Here, the center curved portion 95a of the U-shaped portion 95 is positioned in front of the center portion of the lower wall portion 86, the left and right inclined portions 95b are extended toward the outside in the oblique rearward and lateral direction from both ends of the center curved portion 95a and, thereafter, the left and right inclined portions 95b are curved toward lateral outside at both sides of the rear portion of the lower wall portion 86 and are formed contiguously with left and right side portions 94.

On both sides of the lower surface of the lower wall portion 86 of the housing 81, a pair of angular projections 88 are mounted in a projecting manner respectively such that the angular projections 88 sandwich the respective left and right inclined portions 95b of the U-shaped portion 95. The respective angular projections 88 are formed in pairs in a rectangular parallelepiped shape along the left and right inclined portions 95b and are arranged at both sides of each one of left and right inclined portions 95b and perform the positioning of the housing 81 with respect to the lower cross beam 93 in the longitudinal and lateral directions along the lower wall portion 86. That is, for positioning the lower end portion of the housing 81 in the direction along the lower end portion, the lower cross beam 93 is arranged to pass between the respective pairs of angular projections 88.

Figure 11:
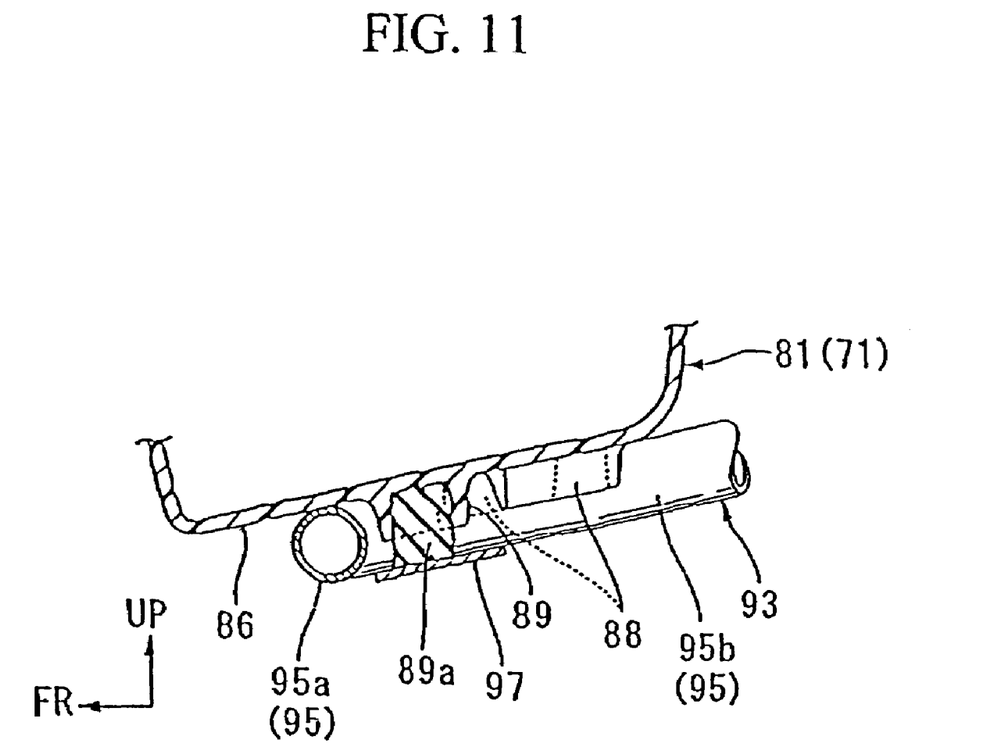
FIG. 11 is a cross-sectional detail view, partially cut away, of the lower wall of the accommodating space and its support structure, taken along a line D-D in FIG. 10.

To explain this embodiment also in conjunction with FIG. 11, at the approximately center of the lower surface of the lower wall portion 86 of the housing 81, a hollow projection 89 which has a cylindrical cross section and projects downwardly is formed. The hollow projection 89 is disposed on the lower wall portion 86 so as to be located on the inner side of the center curved portion 95a of the U-shaped portion 95, wherein a front portion of the hollow projection 89 is curved along the U-shaped portion 95 and a rear portion of the hollow projection 89 is formed in a U-shape which is opened forwardly. In the inside of the hollow projection 89, an upper portion of a cushion 89a, which is formed of a resilient member made of rubber or the like, is fitted and held in a state that the upper portion of the cushion 89 is inserted into the inside of the hollow projection 89 from below.

On the other hand, the support plate 97, which is configured to extend between both inclined portions 95b, is joined by welding to the inside of the center curved portion 95a of the U-shaped portion 95, in a state that the support plate 97 is brought into contact with the inside of the center curved portion 95a from below. Along with an upper surface of the support plate 97, a lower end portion of the resilient member, which is fitted and held in the hollow projection 89, is brought into contact in a state that the lower end portion is pushed downwardly. Accordingly, a portion of weight of both the housing 81 and the amplifier 54 which is housed in the inside of the housing 81 are resiliently supported also by way of the cushion 89a in addition to the lower surface of the lower wall portion 86.

As has been explained above, the audio device arrangement structure in the above mentioned embodiments is characterized in that the structure serves to supportively mount the various components of the audio device 50. The audio device 50 includes the audio unit 51, the amplifier 54 and the respective speakers 52, 53 on the motorcycle 1. In the inventive arrangement structure, the amplifier 54 is provided separate and spaced apart from the audio unit 51 and, at the same time, is arranged in the inside of the housing 81 which is provided at the rear portion of the rear fender 60 of the motorcycle 1.

According to this configuration, as compared to the audio device which integrally incorporates the amplifier 54 in the audio unit 51, it is possible to provide a large-sized amplifier 54, thus realizing high-quality sound, whereby the present invention provides a rider a joy of listening to sophisticated music during touring. Further, by arranging the housing 81 in an area of the motorcycle which would otherwise be a dead space, at the lower position of the rear trunk 29, and between the rear fender 60 and the fender cover 60a, the comparatively large-sized amplifier 54 can be effectively mounted on the motorcycle. In addition, the housing 81 per se is cooled by receiving a wind generated by vehicle travel and, at the same time, the amplifier 54 which is arranged in the inside of the housing 81 is also favorably cooled, whereby the heat radiation property of the amplifier 54 can be enhanced.

Further, in the above-mentioned audio device arrangement structure, the rear fender 60 is configured to be dividable in the longitudinal direction of the vehicle and hence, at the time of maintaining the amplifier 54 or the like, only the side (the rear fender 71) in which the housing 81 of the amplifier 54 in the rear fender 60 is provided needs to be removed, and the maintainability can be enhanced.

Further, in the above-mentioned audio device arrangement structure, the lower cross beam 93 extends between the left and right saddle bag stays 18 which support the saddle bag 40 in the motorcycle 1, the U-shaped portion 95 which supports the housing 81 is formed on the middle portion of the lower cross beam 93, the plurality of pairs of angular projections 88 for positioning the U-shaped portion 95 are formed in the housing 81, and the U-shaped portion 95 is allowed to pass between the respective pairs of angular projections 88 and hence, weights of the housing 81 and the amplifier 54 are supported on the U-shaped portion 95 of the lower cross beam 93 whereby the load attributed to the weight of the amplifier 54 or the like which is applied to the rear fender 60 can be reduced. Further, by allowing the U-shaped portion 95 to pass between the plural projections 88 formed in the housing, it is possible to position the housing 81 in the longitudinal direction as well as in the lateral direction along the lower wall portion 86 whereby the assembling operation of the vicinity of the housing 81 to the vehicle body can be facilitated.

Further, in the above-mentioned audio device arrangement structure, by covering the upper opening 82 of the housing 81 and the upper portion of the amplifier 54 with the cover 91 made of the resilient material, and by partially engaging the cover 91 with the housing 81, it is possible to take in travel-generated wind in the housing 81 by generating the predetermined gap between the opening 82 of the housing 81 and the cover 91 which is engaged with the opening 82, while ensuring the waterproof property of the amplifier 54 whereby the heat radiation property of the amplifier 54 can be further enhanced. Further, by resiliently deforming the cover 91, the amplifier 54 which is sized to extend upward from the upper end of the housing 81, can also be mounted.

Further, in the above-mentioned audio device arrangement structure, since the amplifier 54 is supported on the housing 81 by way of the rubber bushing 57, it is possible to attenuate the propagation of vibrations from the vehicle body to the amplifier 54.

Further, in the above-mentioned audio device arrangement structure, since the water drain hole 87 is formed in the housing 81, even when water invades into the inside of the housing 81, water can be speedily discharged to the outside through the water drain hole 87 whereby the waterproof property of the amplifier 54 can be favorably ensured.

Further, in the above-mentioned audio device arrangement structure, the ventilation hole 58 is formed in the amplifier case 55 and, at the same time, the ventilation hole 58 is covered with the moisture-permeable waterproof sheet 58a and hence, it is possible to assure the ventilation and the waterproof property in the inside of the amplifier case 55 simultaneously. Particularly, even when the amplifier 54 whose temperature is elevated due to the continuous use thereof is covered with water and hence, the inside of the case assumes a low pressure, it is possible to prevent the suction of water through the ventilation hole 58.

While a working example of the present invention has been described above, the present invention is not limited to the working example described above, but various design alterations may be carried out without departing from the present invention as set forth in the claims.

What is claimed is:

1. In a motorcycle of the type having a rear fender and having an audio device thereon, the improvement comprising an audio device arrangement structure which serves to mount the audio device on the motorcycle, wherein the audio device comprises an audio unit which generates audio signals, and
an amplifier and a speaker,
wherein the audio device arrangement structure is configured to mount the amplifier at a location on the motorcycle which is separate and spaced apart from the audio unit, wherein the audio device arrangement structure comprises a hollow housing which is operatively attached to the rear fender of the motorcycle, and the amplifier is disposed inside the housing, and wherein the rear fender is configured to be dividable in a longitudinal direction of the motorcycle, so as to provide a rear fender front portion separable from a rear fender rear portion.

2. The audio device arrangement structure of claim 1, wherein the motorcycle comprises: left and right stays which support a saddle bag on the motorcycle, and a cross beam extending between the left and right stays, the cross beam comprising a bent-shape portion which supports the housing, wherein the housing comprises a plurality of projections formed on an underside thereof for positioning the bent-shape portion, and wherein the bent-shape portion passes between respective projections.

3. The audio device arrangement structure of claim 1, wherein an opening of the housing and an upper portion of the amplifier are covered with a cover which is formed of a resilient material, and the cover is engaged with the housing.

4. The audio device arrangement structure of claim 1, wherein the amplifier is supported on the housing by way of a resilient material.

5. The audio device arrangement structure of claim 1, wherein the housing has a water drain hole formed therein.

6. The audio device arrangement structure of claim 1, wherein the amplifier comprises an amplifier casing having a ventilation hole formed therein, and wherein the ventilation hole is covered with a moisture-permeable waterproof sheet.

7. The audio device arrangement structure of claim 1, wherein the amplifier is sized to reside substantially within the housing, and to extend upwardly from an upper side of the housing, and wherein an upper portion of the amplifier is covered with a cover which is formed of a resilient material, and the cover is engaged with the housing so as to provide a predetermined gap between the housing and the cover, whereby cooling wind generated by vehicle travel flows into said gap, and serves to cool the amplifier during forward movement of the motorcycle.

8. The audio device arrangement structure of claim 1, wherein the amplifier is sized to reside substantially within the housing, and to extend upwardly from an upper opening of the housing, and wherein an upper portion of the amplifier is covered with a cover which is formed of a resilient material, and wherein the cover is resiliently deformed so as to cover the amplifier and engage with the upper opening of the housing.

9. The audio device arrangement structure of claim 1, wherein the motorcycle comprises a seat, and the audio unit is mounted on the motorcycle at the front of the vehicle seat, and wherein the amplifier is provided separately from the audio unit, and is arranged at the rear of the vehicle at a location behind the seat.

10. A motorcycle comprising an audio device, wherein the audio device comprises an audio unit which generates audio signals, an amplifier which amplifies signals output from the audio unit, and a speaker connected to the amplifier, wherein the amplifier is positioned on the motorcycle at a location separate and spaced apart from the audio unit, and wherein the motorcycle comprises a rear fender configured to be dividable in the longitudinal direction of a vehicle so as to provide a rear fender front portion separable from a rear fender rear portion in a manner such that the rear fender rear portion can be removed to permit access to the amplifier, while the rear fender front portion remains in place.

11. The motorcycle of claim 10, wherein the motorcycle further comprises a rear fender and a hollow housing operatively attached to said rear fender, and wherein the amplifier is disposed inside the housing.

12. The motorcycle of claim 11, wherein the motorcycle comprises a vehicle frame, and wherein a rear portion of the vehicle frame underlies the housing, such that the weight of the amplifier and housing are supported on the rear portion of the vehicle frame.

13. The motorcycle of claim 12, wherein the rear portion of the vehicle frame comprises: left and right stays disposed on opposed sides of the motorcycle, the left and right stays extending in the vertical direction, and a cross beam extending between the left and right stays, the cross beam comprising a U-shaped portion formed in the middle of the cross beam, the U-shaped portion supporting an underside of the housing, and wherein the housing comprises a plurality of pairs of angular projections projecting downward from an underside surface of the housing, the angular projections serving to position the housing on the U-shaped portion, the U-shaped portion passing between respective pairs of angular projections.

14. The motorcycle of claim 11, wherein the housing has a water drain hole formed therein.

15. The motorcycle of claim 10, wherein the amplifier is mounted on the motorcycle so as to receive a flow of wind thereon during forward movement of said motorcycle, whereby the amplifier is cooled during vehicle operation.

16. The motorcycle of claim 10, wherein the amplifier is provided with a resilient cover.

17. The motorcycle of claim 10, wherein the amplifier comprises an amplifier casing having a ventilation hole formed therein, and wherein the ventilation hole is covered with a moisture-permeable waterproof sheet.

* * * * *